United States Patent Office 3,151,097
Patented Sept. 29, 1964

3,151,097
MODIFICATION AND CURE OF VINYL CHLORIDE RESIN WITH ALKALI METAL SALTS OF METHYLOLATED PHENOLS
Robert P. Conger, Park Ridge, N.J., assignor to United States Rubber Company, New York, N.Y., a corporation of New Jersey
No Drawing. Filed Nov. 30, 1961, Ser. No. 156,153
11 Claims. (Cl. 260—847)

This invention relates to modification of polyvinyl chloride resin by replacement of a portion of the chlorine atoms by methylolated phenoxy groups, through the use of alkali metal salts of methylolated phenols.

In accordance with the invention a vinyl chloride polymer resin is reacted with a mono-alkali-metal salt of a methylolated phenol. The sodium and potassium salts are preferred because of their lower cost. The vinyl chloride polymer resin may be vinyl chloride homopolymer, or a copolymer of vinyl chloride with a minor amount, up to 49% of the copolymer, of a copolymerizable mono-olefinic monomer. Said monomer may, for example, be vinylidene chloride, vinyl acetate, vinyl stearate, acrylonitrile, diethyl maleate, methyl acrylate, butyl acrylate, methyl methacrylate, allyl chloride, vinyl chloroacetate, ocimene, dipentene, phellandrene. The alkali metal salt of methylolated phenol may be a 2,6-dimethylol-4-(lower alkyl)phenol or a 2,4-di(lower alkyl)-6-methylol phenol such as, e.g., 2-methyl-4-tert-butyl-6-methylolphenol). "Lower alkyl" as used herein denotes alkyl having from 1 to 10 carbon atoms. The methylolated phenol may be 2,2'-methylenebis(4-chloro-6-methylolphenol). In the resulting product some of the chlorine atoms are replaced by methylolphenoxy groups, so that the polymer chains are composed of recurring —CH$_2$CHCl— and —CH$_2$CHZ— units, where Z is a methylolated phenoxy group.

The resulting product is characterized by the ability to be cured or cross-linked simply by heating. Films, coatings and structural materials may be first formed and thereafter cross-linked by heat alone. The modified polyvinyl chloride compositions are also useful as adhesives; for example, they are effective in bonding polyvinyl chloride to nylon. They may be compounded with blowing agents prior to cure to make expanded resin, with or without a supporting fabric backing and/or a non-blown plastic facing.

The process and product of the invention are quite distinct from those of Plauson, U.S. Patent 1,451,843, who shows that a vinyl chloride polymer can be treated with a mixture of phenol and formaldehyde or with a condensation product of phenol and formaldehyde to produce a new resin, useful as a varnish, which is soluble in solvents which do not dissolve the vinyl polymer. The product of Plauson does not cross-link on heating.

The modifying agents employed in the invention may be prepared before addition to the vinyl resin; but, in many cases, they may be prepared in the resin or in a solution of the resin.

The amount of modifying agent may be varied so as to replace from only a small amount of the chlorine up to nearly all of it. From about 1 part to 10 parts of modifying agent per 100 parts by weight of vinyl chloride resin is in many cases the preferred amount to produce useful results.

The modification reaction is effected by heating the vinyl chloride resin and the modifying agent in mutual solution in any common solvent medium that is substantially inert under the conditions of the reaction. Among the particularly suitable solvents may be mentioned ketones, hydrocarbons, halogenated hydrocarbons, ethers, alcohols, and the like, and mixtures of such solvents. To effect the reaction the solution is conveniently heated at or below its reflux temperature. Reaction temperatures of 50°–100° C. are usual. Ordinarily a significant amount of reaction will take place within about ½ hour or so, and ordinarily there is no proportionate added advantage in carrying out the reaction for more than about 10 hours.

If prepared in solution, and the solution is neutralized after the reaction has occurred, the reaction product may be isolated by evaporating the solvent, or by precipitating the product with a non-solvent, such as water. The product is found to be processible, stable, resinous material that may be shaped (e.g., calendered, molded, extruded) in essentially the same manner as the unmodified vinyl chloride resin. The product is stable in solution and in bulk.

The product can be cured or cross-linked simply by heating it to an elevated temperature, with or without prior addition of conventional compounding ingredients. Pigments or fillers, plasticizers or the like, or other rubbers and/or resins and/or graft copolymers such as styrene-acrylonitrile resin, butadiene-acrylonitrile rubber, graft copolymers of one or more such monomers as styrene, alpha-methylstyrene, acrylonitrile, methyl methacrylate on polybutadiene or copolymers thereof, styrene-methyl methacrylate resin, alpha-methyl styrene-acrylonitrile resin, etc., may be included in the compositions as desired. The cure may take place while the product is exposed either to air or, less desirably, to an inert atmosphere. The time and temperature conditions employed for such cure are generally inversely related and will vary widely in practice, depending on such factors as the degree of cure desired, the kind and amount of modifying agent employed and the extent of the modification, the size of the article, the character of the heating device, etc. In many cases particuarly useful results are obtained by heating for a period of from about ½ to 10 hours at a temperature of from about 250° to 400° F.

The invention is further illustrated by the examples which follow:

*Example I*

This example demonstrates the modification of polyvinyl chloride by reaction with the monopotassium salt of 2,2'-methylenebis(4-chloro-6-methylolphenol).

2,2'-methylenebis(4 - chloro - 6 - methylolphenol), 328 grams, was stirred into a solution of 66.8 grams of KOH in such an amount of water that a stirrable slurry was formed. The mixture was stirred one-half hour at room temperature, washed with water by decantation, and the product air-dried to yield 341 grams of the desired monopotassium salt of 2,2'-methylenebis (4-chloro-6-methylolphenol).

To a solution of 20 grams of polyvinyl chloride in 180 ml. of 2-butanone at 76° C. was added 2.0 grams of the above potassium salt. After heating to reflux for 1 hour the solution had become moderately alkaline. The solution was then neutralized, as by addition of glacial acetic acid. Such adjustment of the acidity is necessary, otherwise the product blackens and evolves HCl on heating. The polymer was precipitated by addition of water, filtered and vacuum-dried at room temperature. Analysis: found; percent C, 40.19; percent H, 4.93; percent Cl, 48.38. The carbon analysis corresponds to a modified polymer containing 11.27% of the phenol moiety.

To the dried polymer was added 0.4 gram of dibutyltin maleate, on a two-roll mill at 290° F. A film was prepared by dissolving the modified polymer in 2-butanone and casting upon a glass plate. The dried film was then heated for 60 minutes at 320° F. It was found to be insoluble in 2-butanone, i.e., it had become cross-linked.

Polyvinyl chloride treated in the same way, except that the potassium salt was omitted, did not become cross-linked under these conditions.

*Example II*

This example illustrates the modification of polyvinyl chloride by the monopotassium salt of 2,6-dimethylol-4-tert-butylphenol.

The required potassium salt was prepared by stirring 6.3 grams of 2,6-dimethylol-4-tert-butylphenol into a solution of 1.7 grams of potassium hydroxide in 50 ml. of ethanol. Reaction occurred immediately at room temperature, and the solid product was filtered off and air-dried.

To a solution of 10 grams of polyvinyl chloride in 500 ml. of 2-butanone at 76° C. was added 0.5 gram of the above potassium salt. The mixture was heated to reflux for 2 hours during which time the potassium salt dissolved. The solution was neutralized with acetic acid. Water was added to the cooled solution to produce the modified polyvinyl chloride as a solid, which was soluble in 2-butanone. Films cast from this solution became insoluble in 2-butanone after being heated 20 min. at 320° F., showing that vulcanization had occurred. Under the same conditions untreated polyvinyl chloride did not become cross-linked.

*Example III*

This example demonstrates the utility of the modified polyvinyl chloride compositions as adhesives for bonding polyvinyl chloride to nylon.

A modified polyvinyl chloride solution was prepared by stirring 10 grams of the potassium salt of 2,2'-methylenebis-(4-chloro-6-methylolphenol), prepared as described in Example I, into a solution of 100 grams of polyvinyl chloride in 900 ml. of 2-butanone at 79° C., and heating to reflux for 1 hour. After neutralization with glacial acetic acid, the resultant solution was applied as a dip coat to nylon fabric to give a pick-up, after air-drying at room temperature, of 12% by weight of the fabric. A plastisol made from 100 parts of polyvinyl chloride, 70 parts of dioctyl phthalate and 2 parts of dibutyltin maleate was then spread-coated on the nylon fabric to which the modified polyvinyl chloride had been applied. In order to produce convenient test pieces, two test strips 1 inch wide and of suitable length were thus prepared, and the plastisol surface of one strip was pressed upon the plastisol surface of the other strip, and the assembly was heated in an air-oven at 320° F. for 30 minutes. The average pull required, from a number of tests, to separate the nylon from the plastisol of such a test piece was found to be 6.5 lbs. per inch, whereas an assembly made and tested the same way except that the modified polyvinyl chloride coating was omitted required only an average pull of 2.75 lbs. per inch to cause separation.

An even stronger bond of plastisol to nylon was obtained by first dipping the nylon fabric into a solution comprising 5% by weight of 2,6-dimethylol-4-tert-butylphenol and 5% by weight of resorcinol in ethanol, thereafter air-drying to obtain a 12% by weight pick-up on the nylon, then applying the modified polyvinyl chloride as a second dip, and finally proceeding as before. The average pull required to cause separation of nylon from plastisol now was found to be 8.75 lbs. per inch.

Having thus described my invention, what I claim and desire to protect by Letters Patent is:

1. A method of modifying chloride resin which comprises mixing 100 parts by weight of said resin with from 1 to 10 parts by weight of a mono alkali metal salt of a methylolated phenol selected from the group consisting of 2,6-dimethylol-4-(lower alkyl)phenols, 2,4-di(lower alkyl)-6-methylolphenols, and 2,2'-methylenebis(4-chloro-6-methylolphenol), and heating the mixture at 50°–100° C. for ½ to 10 hours.

2. A method as in claim 1 in which the vinyl chloride resin is polyvinyl chloride.

3. A method as in claim 1 in which the said phenol is a 2,2'-methylenebis(4-chloro-6-methylolphenol).

4. A method as in claim 1 in which the said phenol is 2,6-dimethylol-4-(lower alkyl)phenol.

5. A method as in claim 1 in which the said phenol is a 2,4-di(lower alkyl)-6-methylolphenol.

6. A method as in claim 3 in which the vinyl chloride resin is polyvinyl chloride.

7. A method as in claim 4 in which the vinyl chloride resin is polyvinyl chloride.

8. A method as in claim 5 in which the vinyl chloride resin is polyvinyl chloride.

9. A method of making a cured, shaped article from a vinyl chloride resin comprising mixing 100 parts by weight of said resin with from 1 to 10 parts of a mono alkali metal salt of a methylolated phenol selected from the group consisting of 2,6-dimethylol-4-(lower alkyl) phenols, 2,4-di(lower alkyl)-6-methylolphenols, and 2,2'-methylenebis-(4-chloro-6-methylolphenol), heating the mixture at 50°–100° C. for ½ to 10 hours to provide an uncured reaction product of said vinyl resin and salt, shaping the uncured reaction product into a desired form, and thereafter curing the reaction product by heating it at a temperature of 250°–400° F. for ½ to 10 hours.

10. A reaction product made by heating 100 parts by weight of a vinyl chloride resin in admixture with from 1 to 10 parts by weight of a mono alkali metal salt of a methylolated phenol selected from the group consisting of 2,6-dimethylol-4-(lower alkyl) phenols, 2,4-di(lower alkyl)-6-methylolphenols, and 2,2'-methylenebis-(4-chloro-6-methylolphenol) at 50°–100° C. for ½ to 10 hours.

11. A cured product made by heating the reaction product of claim 10 at 250–400° F. for ½ to 10 hours.

References Cited in the file of this patent

UNITED STATES PATENTS 2,454,209    Rogers _____ Nov. 16, 1948

OTHER REFERENCES

Brodskii, Chemical Abstracts, volume 54, 7211g (April 1960).

UNITED STATES PATENT OFFICE
CERTIFICATE OF CORRECTION

Patent No. 3,151,097                 September 29, 1964

Robert P. Conger

It is hereby certified that error appears in the above numbered patent requiring correction and that the said Letters Patent should read as corrected below.

Column 4, line 7, after "modifying" insert -- vinyl --.

Signed and sealed this 23rd day of November 1965.

(SEAL)
Attest:

ERNEST W. SWIDER                EDWARD J. BRENNER
Attesting Officer                 Commissioner of Patents